(12) United States Patent
Thompson et al.

(10) Patent No.: US 6,212,870 B1
(45) Date of Patent: Apr. 10, 2001

(54) SELF FIXTURING COMBUSTOR DOME ASSEMBLY

(75) Inventors: James E. Thompson, Middletown; Byron A. Pritchard, Jr., Loveland; Mark M. Glevicky, Blue Ash; Paul J. Ogden, Mason, all of OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/158,409

(22) Filed: Sep. 22, 1998

(51) Int. Cl.$^7$ .................................................. F23R 3/14
(52) U.S. Cl. ..................... 60/39.02; 60/748; 60/39.31; 60/746
(58) Field of Search ........................... 60/39.31, 39.32, 60/39.02, 737, 740, 746, 747, 748

(56) References Cited

U.S. PATENT DOCUMENTS

| | | | |
|---|---|---|---|
| 3,742,704 | * 7/1973 | Adelizzi et al. | 60/39.31 |
| 3,780,529 | * 12/1973 | Johnson | 60/39.32 X |
| 4,180,972 | * 1/1980 | Herman et al. | 60/39.32 |
| 4,180,974 | * 1/1980 | Stenger et al. | 60/748 |
| 4,525,996 | * 7/1985 | Wright et al. | 60/39.31 |
| 5,237,820 | * 8/1993 | Kastl et al. | 60/752 |
| 5,274,995 | 1/1994 | Horner et al. | 60/39.55 |
| 5,285,632 | * 2/1994 | Halila | 60/39.31 |
| 5,285,635 | 2/1994 | Savelli et al. | 60/39.36 |
| 5,321,951 | 6/1994 | Falls et al. | 60/748 |
| 5,331,815 | * 7/1994 | Reinhold, Jr. et al. | 60/748 |
| 5,771,696 | 6/1998 | Hansel et al. | 60/739 |
| 5,916,142 | * 6/1999 | Snyder et al. | 60/748 |

* cited by examiner

Primary Examiner—Ted Kim
(74) Attorney, Agent, or Firm—Andrew C. Hess; Rodney M. Young

(57) ABSTRACT

Assembly of the combustor dome in a gas turbine engine is facilitated by providing a self-fixturing configuration. The combustor dome assembly is made up of a dome plate having a plurality of swirler assemblies mounted therein. Each swirler assembly is provided with a locating pin that extends between the dome plate and the swirler assembly for positioning the swirler assembly with respect to the dome plate without the use of fixturing tools. Preferably, the swirler assembly includes a swirl cup and an outlet sleeve mounted in the dome plate. The locating pin is pressed into a hole formed in the swirl cup. One end of the pin is received in a slot formed in the dome plate, and the other end of the pin is received in a slot formed in the outlet sleeve. Thus, the locating pin sets the circumferential orientation of the swirler assembly in relation to the dome plate. A shoulder on the swirl cup sets the cup axially with respect to the dome plate, and a shoulder on the outlet sleeve sets the sleeve axially with respect to the swirl cup.

13 Claims, 5 Drawing Sheets

SELF FIXTURING COMBUSTOR DOME ASSEMBLY

BACKGROUND OF THE INVENTION

This invention relates generally to gas turbine engines and more particularly to combustion systems in such engines.

A gas turbine engine includes a compressor that provides pressurized air to a combustor wherein the air is mixed with fuel and ignited for generating hot combustion gases. These gases flow downstream to one or more turbines that extract energy therefrom to power the compressor and provide useful work such as powering an aircraft in flight. Combustors used in aircraft engines typically include inner and outer combustion liners joined at their upstream ends to a one-piece stamped dome plate. The dome plate has a plurality of circumferentially spaced swirler assemblies mounted therein for introducing the fuel/air mixture to the combustion chamber.

The position of the swirler assemblies with respect to the dome plate is critical to the performance and functionality of the combustor. Consequently, dome fixturing tools are required to set the proper gap and orientation of the swirler assemblies in relation to each other and the dome plate. The use of these tools is time consuming and adds cost to the process of assembling gas turbine combustors.

Accordingly, there is a need for a combustor dome assembly that can be assembled easily and quickly without the use of fixturing tools.

SUMMARY OF THE INVENTION

The above-mentioned needs are met by the present invention which provides a combustor dome assembly made up of a dome plate having a plurality of swirler assemblies mounted therein. Each swirler assembly is provided with a locating pin that extends between the dome plate and the swirler assembly for positioning the swirler assembly with respect to the dome plate. Preferably, the swirler assembly includes a swirl cup and an outlet sleeve mounted in the dome plate. The locating pin is pressed into a hole formed in the swirl cup. One end of the pin is received in a slot formed in the dome plate, and the other end of the pin is received in a slot formed in the outlet sleeve. Thus, the locating pin sets the circumferential orientation of the swirler assembly in relation to the dome plate. A shoulder on the swirl cup sets the cup axially with respect to the dome plate, and a shoulder on the outlet sleeve sets the sleeve axially with respect to the swirl cup. Accordingly, the swirler assembly can be mounted to the dome plate in its proper orientation without the need to use fixturing tools.

Other objects and advantages of the present invention will become apparent upon reading the following detailed description and the appended claims with reference to the accompanying drawings.

DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
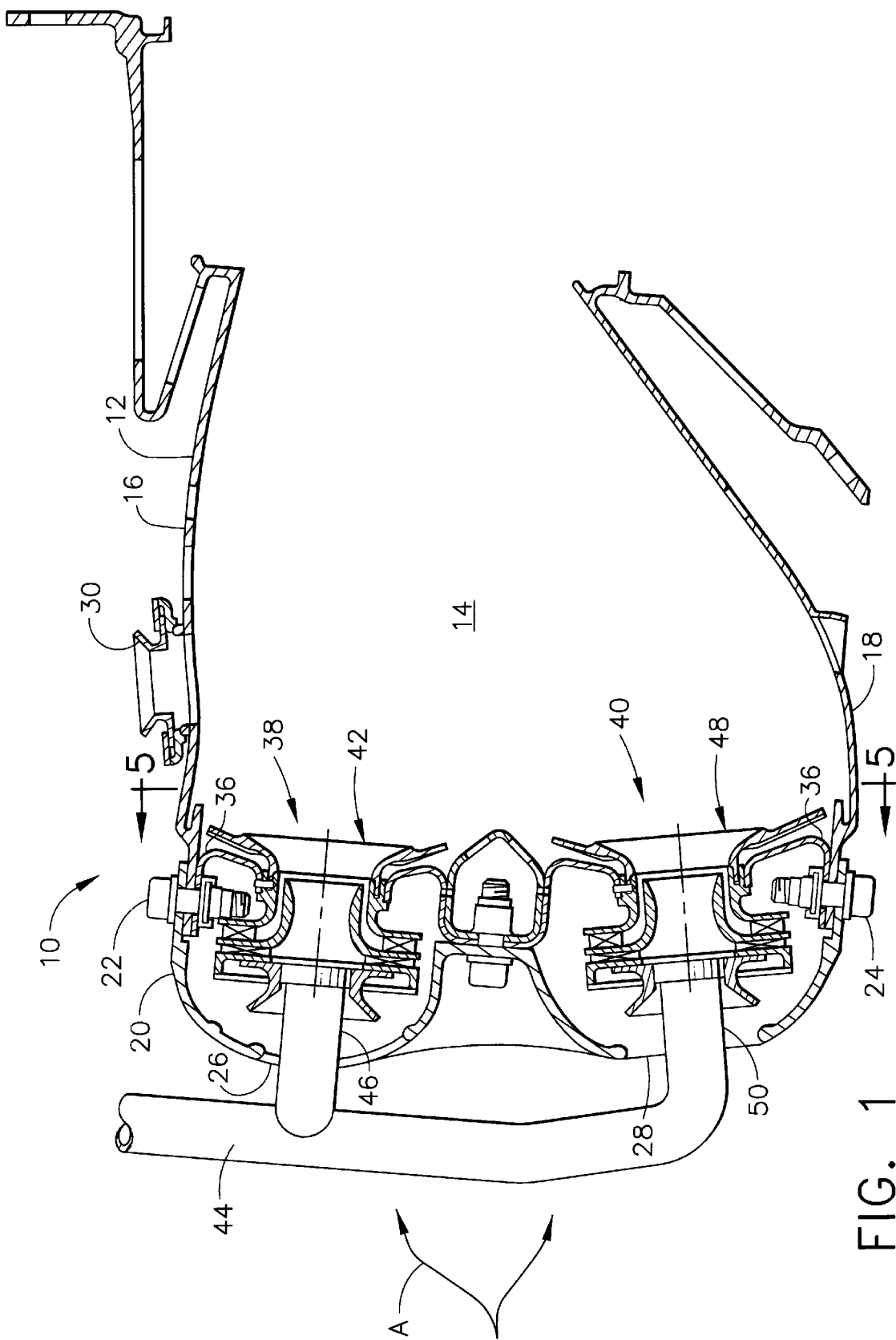
FIG. 1 is an axial cross-sectional view of the combustion region of a gas turbine engine in accordance with the present invention.

Referring to the drawings wherein identical reference numerals denote the same elements throughout the various views, FIG. 1 shows a combustor 10 of the type suitable for use in a gas turbine engine and including a hollow body 12 defining a combustion chamber 14 therein. Hollow body 12 is generally annular in form and is comprised of an outer liner 16 and an inner liner 18. The upstream end of hollow body 12 is substantially closed off by a cowl 20 attached to outer liner 16 by a first fastener 22 and to inner liner 18 by a second fastener 24. A pair of annular openings 26 and 28 is formed in cowl 20 for the introduction of fuel and compressed air. The compressed air is introduced into combustor 10 from a compressor (not shown) in a direction generally indicated by arrows A of FIG. 1. The compressed air passes principally through annular openings 26 and 28 to support combustion and partially into the region surrounding hollow body 12 where it is used to cool the liners 16 and 18 and to cool turbomachinery further downstream. An igniter port 30 is formed in outer liner 16 to support an igniter tube (not shown) so as to provide ignition capability to combustor 10.

Disposed between and interconnecting the outer and inner liners 16 and 18 near their upstream ends is an annular dome plate 36. Dome plate 36 is shaped to define an outer dome 38 and an inner dome 40. Outer and inner domes 38 and 40 form the forward boundaries of two separate, radially spaced regions that act somewhat independently as separate combustors during various staging operations. Such a configuration is commonly known as a double annular combustor. Disposed in outer dome 38 is a plurality of circumferentially spaced swirler assemblies 42 having their axes aligned substantially parallel with outer liner 16 to present an annular combustor profile that is substantially straight. Swirler assemblies 42 receive compressed air from annular opening 26 and fuel from a fuel tube 44 through a fuel nozzle 46.

In a similar manner, inner dome 40 includes a plurality of circumferentially spaced swirler assemblies 48 whose axes are slanted radially outwardly to present an annular combustor profile that intersects with that of outer dome 38. Swirler assemblies 48 receive compressed air from annular opening 28 and fuel from fuel tube 44 through a fuel nozzle 50. The dome plate 36 together with swirler assemblies 42 and 48 make up a combustor dome assembly in accordance with the present invention. While the combustor dome assembly of the present invention is exemplified here in a double annular type combustor, it should be noted that the inventive aspects of the combustor dome assembly described herein are equally applicable to other types of combustors, including single annular combustors.

Figure 2:
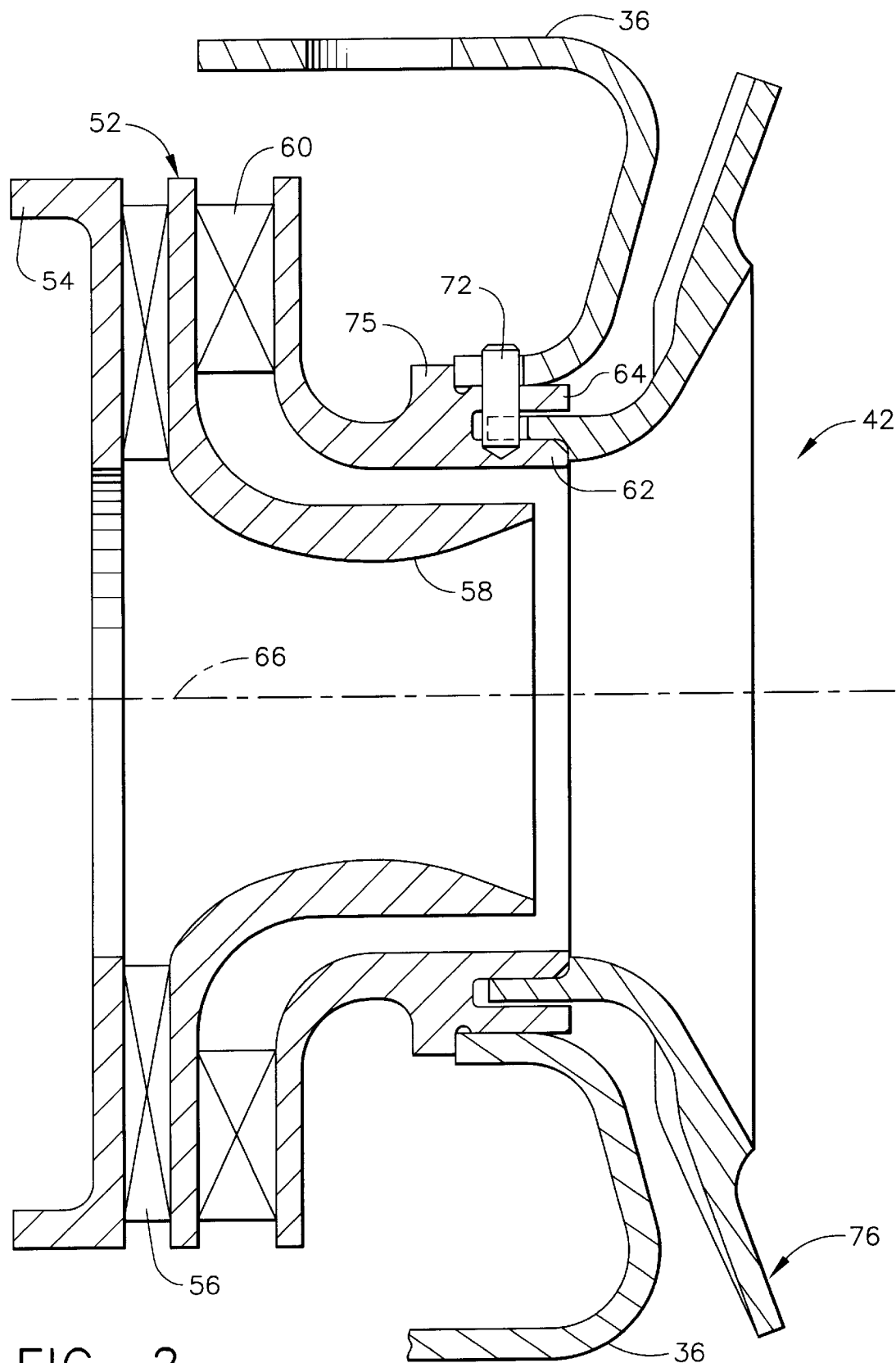
FIG. 2 is an enlarged sectional view of a swirler assembly in accordance with a preferred embodiment of the present invention.
Figure 3:
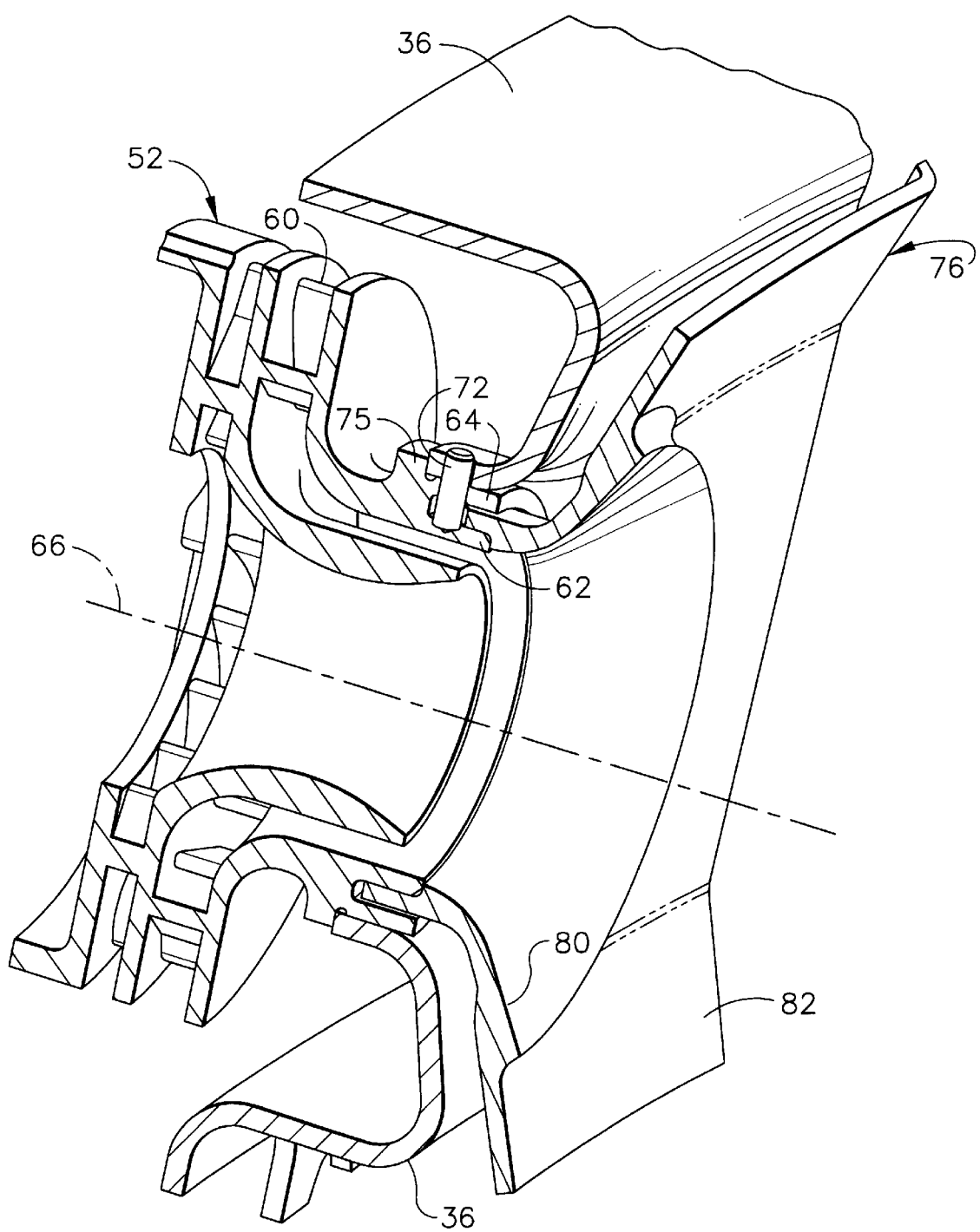
FIG. 3 is a perspective view, in cross-section, of the swirler assembly of FIG. 2.
Figure 4:
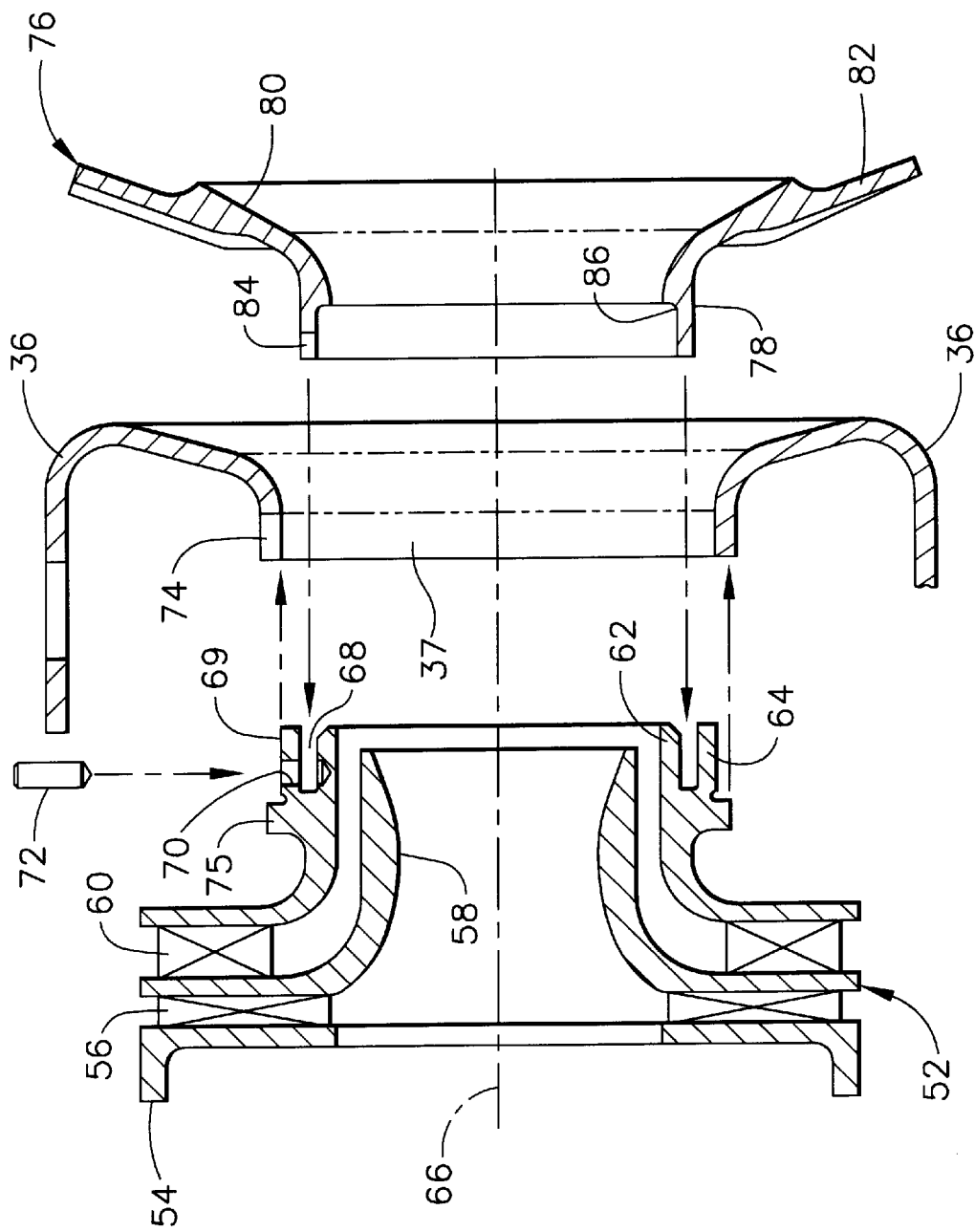
FIG. 4 is an exploded sectional view of a swirler assembly of FIG. 2.

Turning now to FIGS. 2–4, one of the outer swirler assemblies 42 is shown in more detail. Although FIGS. 2–4 depict an outer swirler assembly 42, it should be understood that inner swirler assemblies 48 are substantially identical structurally to outer swirler assemblies 42, except that they may be sized to provide different airflow capacities. As such, the following description will also apply to the inner swirler assemblies 48.

The forward end of swirler assembly 42 encompasses a swirl cup 52. Swirl cup 52 includes at its forward end a cap plate 54 that coaxially receives the fuel nozzle 46. A primary swirler 56 is joined to the aft or downstream side of cap plate 54. The primary swirler 56 receives air from annular opening 26 to interact with fuel from fuel nozzle 46 and swirl it into a venturi 58. A secondary swirler 60 located downstream of primary swirler 56 then acts to present a swirl of air in the opposite direction so as to interact with the fuel/air mixture to further atomize the mixture and cause it to flow into combustion chamber 14. Swirl cup 52 is preferably made of a single casting although some or all of cap plate 54, primary swirler 56, venturi 58 and secondary swirler 60 could be separate elements joined together by brazing.

Disposed on the downstream end of secondary swirler 60, and hence the downstream end of swirl cup 52, are first and second axially extending annular flanges 62 and 64. Annular flanges 62 and 64 are disposed concentrically about the longitudinal axis 66 of swirl cup 52, with second flange 64 spaced radially out from first flange 62 so as to define an annular groove 68 between the two flanges 62 and 64. Second annular flange 64 defines an outer cylindrical surface 69 that is snugly received within the opening or eyelet 37 formed in dome plate 36 for mounting swirler assembly 42. A small hole 70 is formed in second annular flange 64 for receiving a locating pin 72. Hole 70 is located a short distance upstream from the aft end of flange 64 and at a predefined circumferential position. Locating pin 72 is pressed into hole 70 so that one end of pin 72 extends radially inwardly of second flange 64 so that at least a portion of this end is situated in annular groove 68. The other end of pin 72 extends radially beyond the outer cylindrical surface 69 of second flange 64. A first slot 74 is formed in the forward facing edge of dome plate 36 that defines eyelet 37. Slot 74 extends radially through the forward facing edge and is located at a predefined circumferential position so that the end of pin 72 extending beyond cylindrical surface 69 is received therein. A radially protruding shoulder 75 is formed on secondary swirler 60 just upstream of second annular flange 64 for abutment with the forward facing edge defining eyelet 37.

Figure 5:
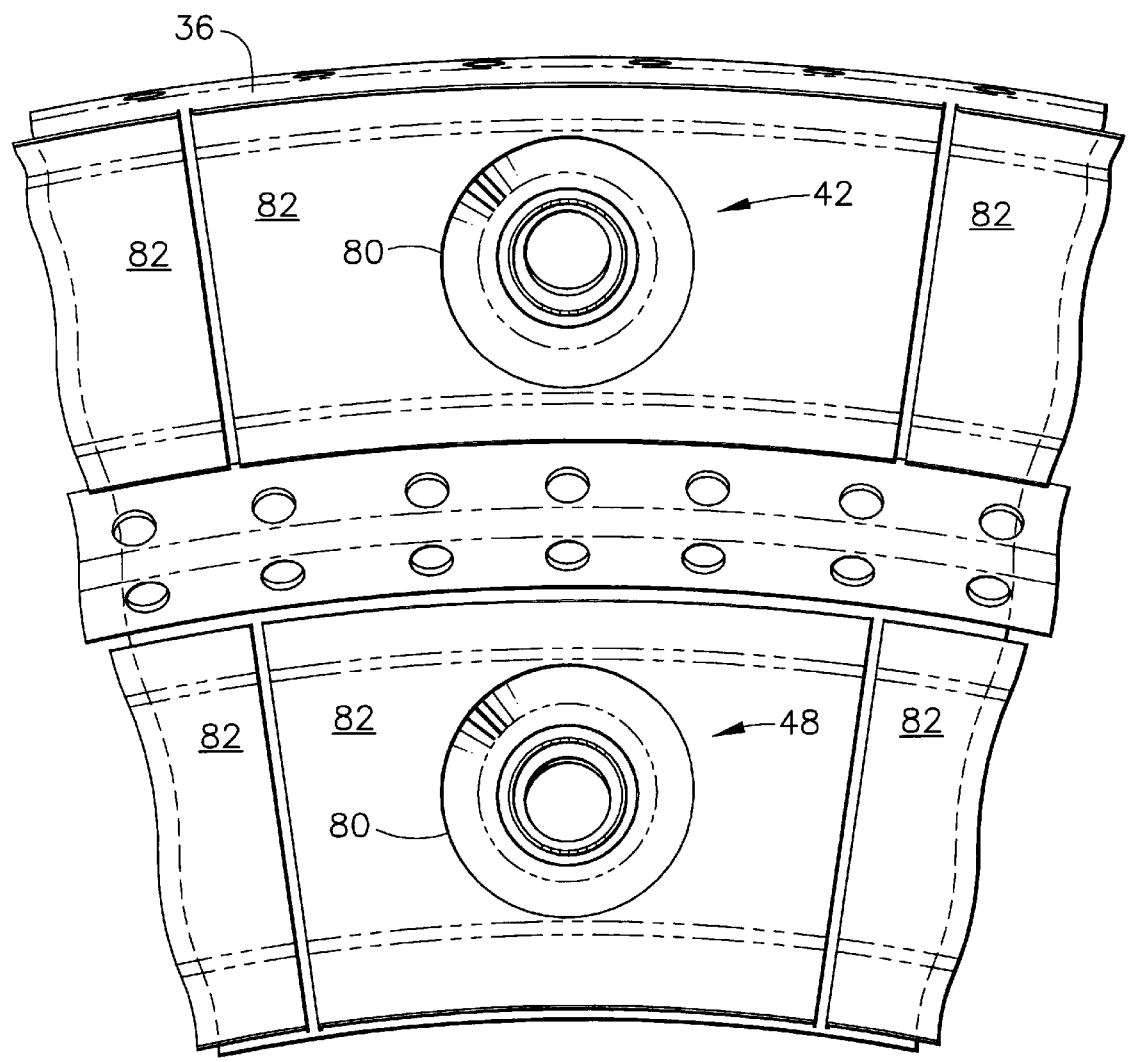
FIG. 5 is an upstream facing view of the combustor shown in FIG. 1 and taken generally along the line 5—5.

Swirler assembly 42 also includes an outlet sleeve 76 attached to the downstream end of swirl cup 52. Outlet sleeve 76 has a substantially cylindrical body portion 78 at its upstream end and a flared or diverging portion 80 formed on the downstream end of body portion 78. A flared splash plate portion 82 extends radially outwardly from diverging portion 80. As best seen in FIG. 5, splash plate portion 82, which prevents excessive dispersion of the fuel/air mixture, has a substantially rectangular shape with side edges in close juxtaposition with adjacent splash plate portions 82. Proper circumferential orientation of the outlet sleeves 76 is needed to align adjacent side edges. Body portion 78 is sized so that its upstream end will fit in annular groove 68 of swirl cup 52. A second slot 84 is formed, at a predefined circumferential position, in the upstream end of body portion 78 so that the end of pin 72 extending into annular groove 68 is received therein. An annular shoulder 86 is formed on the inside surface of body portion 78 just downstream of the forward edge to function as an abutment for the aft edge of first annular flange 62. Outlet sleeve 76 is preferably formed as a single casting.

The combustor dome assembly of the present invention is assembled by first pressing a locating pin 72 into hole 70 of a swirl cup 52. The downstream end of swirl cup 52 is then inserted into an eyelet 37 in dome plate 36 so that the protruding end of pin 72 is received within dome plate slot 74 and radial shoulder 75 abuts the forward facing edge of dome plate 36 defining eyelet 37. Swirl cup 52 is then brazed to dome plate 36. Next, the upstream end of an outlet sleeve 76 is inserted into annular groove 68 of swirl cup 52 so that pin 72 is received within second slot 84 and shoulder 86 abuts the aft edge of first annular flange 62. Outlet sleeve 76 is brazed to swirl cup 52. This process is repeated for each of the remaining outer and inner swirler assemblies 42 and 48.

Thus, shoulders 75 and 86 fix swirl cups 52 and outlet sleeves 76 axially with respect to dome plate 36, and locating pins 72 interact with the corresponding slots 74 and 84 to properly orient swirl cups 52 and outlet sleeves 76 circumferentially with respect to dome plate 36. As best seen in FIG. 5, proper circumferential orientation of the outlet sleeves 76 will also ensure that adjacent splash plate portions 82 are properly aligned.

While the present invention has been described as having a one-piece outlet sleeve 76 that combines a divergent sleeve with a splash plate, it should be noted that other configurations are possible. For example, it is well known in the art to provide a two-piece configuration of a divergent sleeve and a splash plate that are separate elements, both being attached to the swirl cup. This type of arrangement could be used in the present invention wherein both the divergent sleeve and the splash plate would have slots formed therein that would engage the locating pin so as to circumferentially orient these pieces with respect to the dome plate.

The foregoing has described a combustor dome assembly that is readily assembled without the need for fixturing tools. While specific embodiments of the present invention have been described, it will be apparent to those skilled in the art that various modifications thereto can be made without departing from the spirit and scope of the invention as defined in the appended claims.

What is claimed is:

1. A combustor dome assembly comprising:
   a dome plate having an eyelet defining a forward facing edge and a slot formed in said edge;
   a swirler assembly mounted in said eyelet; and
   a locating pin extending between said slot and said swirler assembly for positioning said swirler assembly with respect to said dome plate.

2. The combustor dome assembly of claim 1 wherein said swirler assembly comprises a swirl cup having a downstream end and a hole formed in said downstream end, said locating pin being disposed in said hole.

3. The combustor dome assembly of claim 2 wherein said swirler assembly further comprises an outlet sleeve attached to said downstream end of said swirl cup, said outlet sleeve having a slot formed therein, said locating pin being received in said outlet sleeve slot.

4. The combustor dome assembly of claim 3 wherein said outlet sleeve comprises a body portion having an upstream end and a downstream end, a diverging portion formed on said downstream end of said body portion, and a splash plate portion extending radially outwardly from said diverging portion, said slot being formed at said upstream end of said outlet sleeve body portion.

5. The combustor dome assembly of claim 2 wherein swirl cup comprises first and second axially extending annular flanges located at said downstream end of said swirl cup, said first and second flanges defining an annular groove therebetween, said hole being formed in said second flange and said locating pin being disposed in said hole so that a first end of said locating pin is at least partially located in said annular groove and a second end of said locating pin extends radially beyond said second flange.

6. The combustor dome assembly of claim 5 wherein said swirler assembly further comprises an outlet sleeve having an upstream end disposed in said annular groove, said upstream end of said outlet sleeve having a slot formed therein, said first end of said locating pin being received in said outlet sleeve slot.

7. The combustor dome assembly of claim 1 wherein said swirler assembly comprises an outlet sleeve having a slot formed therein, said locating pin being received in said outlet sleeve slot.

8. The combustor dome assembly of claim 7 wherein said outlet sleeve includes a splash plate portion extending radially outwardly therefrom.

9. The combustor dome assembly of claim 8 wherein said splash plate portion has a substantially rectangular shape.

10. The combustor dome assembly of claim 1 wherein said slot extends radially through said edge.

11. A combustor dome assembly comprising:
    a dome plate having a plurality of eyelets formed therein, each eyelet defining a forward facing edge and having a slot formed in said edge;
    a plurality of swirler assemblies, each one of said swirler assemblies being mounted in one of said eyelets; and
    a plurality of locating pins, each one of said plurality of locating pins extending between one of said slots and one of said plurality of swirler assemblies for positioning said swirler assemblies with respect to said dome plate.

12. A method of assembling a combustor dome assembly of the type having a plurality of swirler assemblies mounted in a dome plate, said method comprising the steps of:
    providing a dome plate having a plurality of eyelets formed therein, each eyelet defining a forward facing edge and having a slot formed in said edge;
    inserting a locating pin in a hole in a swirler assembly; and
    mounting said swirler assembly in said eyelet so that said pin is received in said slot.

13. The method of claim 12 wherein said swirler assembly comprises a swirl cup and an outlet sleeve having a slot and said step of mounting said swirler assembly comprises the substeps of:
    disposing said swirl cup in said dome plate so that one end of said locating pin is received in said slot in said dome plate; and
    mounting said outlet sleeve to said swirl cup so that the other end of said locating pin is received in said slot in said outlet sleeve.

* * * * *